United States Patent
Liu

(10) Patent No.: US 8,054,040 B2
(45) Date of Patent: Nov. 8, 2011

(54) BATTERY COVER ASSEMBLY USED IN PORTABLE ELECTRONIC DEVICE

(75) Inventor: Chia-Shien Liu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 800 days.

(21) Appl. No.: 12/164,254

(22) Filed: Jun. 30, 2008

(65) Prior Publication Data

US 2009/0170577 A1    Jul. 2, 2009

(30) Foreign Application Priority Data

Dec. 27, 2007 (CN) .......................... 2007 1 0203499

(51) Int. Cl.
*H02J 7/00* (2006.01)

(52) U.S. Cl. .................... 320/112; 320/107; 429/148

(58) Field of Classification Search .................... 320/112
See application file for complete search history.

(56) References Cited

U.S. PATENT DOCUMENTS

| | | | | |
|---|---|---|---|---|
| 5,645,954 | A * | 7/1997 | Tamaru | 429/100 |
| 6,224,997 | B1 * | 5/2001 | Papadopoulos | 429/99 |
| 6,989,217 | B2 * | 1/2006 | Suto | 429/178 |
| 7,332,244 | B2 * | 2/2008 | Uemoto et al. | 429/185 |
| 2005/0112457 | A1 * | 5/2005 | Breen et al. | 429/99 |
| 2005/0208345 | A1 * | 9/2005 | Yoon et al. | 429/7 |
| 2005/0287435 | A1 * | 12/2005 | Kim | 429/174 |
| 2006/0115715 | A1 * | 6/2006 | Ge et al. | 429/97 |
| 2006/0166083 | A1 * | 7/2006 | Zhang et al. | 429/97 |

FOREIGN PATENT DOCUMENTS

CN   2391308 Y   8/2000

* cited by examiner

*Primary Examiner* — Arun Williams
(74) *Attorney, Agent, or Firm* — Altis Law Group, Inc.

(57) ABSTRACT

A battery cover assembly (10) including a body (11), a first cover (12) and a second cover (13) is provided. The body includes a battery receptacle (115). Both of the first cover and the second cover respectively include two sidewalls (123, 124, 133, 134) removably mounted to the body and a top wall (121, 131) connected to the pair of sidewalls. The top walls of the first cover and the second cover protrude out from the body while the first cover and the second cover are assembled to the body. Both of the first cover and the second cover are configured to be removably mounted to the body. The first cover and the second cover are engageable with each other so as to cover the battery receptacle.

8 Claims, 5 Drawing Sheets

BATTERY COVER ASSEMBLY USED IN PORTABLE ELECTRONIC DEVICE

BACKGROUND OF THE INVENTION

1. Field of the Invention

The present invention generally relates to a battery cover assembly and particularly to a battery cover assembly used in a portable electronic device.

2. Discussion of the Related Art

Batteries are widely used as power supplies in portable electronic devices, such as cellular phones, personal digital assistants (PDAs), and so on. The typical battery cover assembly generally includes a top wall, a pair of side walls, and a bottom wall that is opposite to the top wall. A recess is defined in a main body of a cellular phone to define a battery receptacle. In this way, the battery is arranged to be received in the recess and be covered by a battery cover.

As a variety of multimedia functions are developed for the portable electronic devices, such functions consequently contribute to high power consumption of the portable electronic devices. Accordingly, the batteries with high capacity, which generally relate to large volume, are desired for supplying sufficient power to the portable electronic devices. Such batteries require large amounts of space to be accommodated therein, which increases the size of the portable electronic device.

Therefore, a new battery cover assembly capable of covering the battery with larger volume is desired in order to overcome the above-described problems.

BRIEF DESCRIPTION OF THE DRAWINGS

Many aspects of the battery cover assembly can be better understood with reference to the following drawings. The components in the drawings are not necessarily to scale, the emphasis instead being placed upon clearly illustrating the principles of the present battery cover assembly. Moreover, in the drawings, like reference numerals designate corresponding parts throughout the several views.

DETAILED DESCRIPTION OF THE EMBODIMENTS

The present battery cover assembly may be applied to a variety of portable electronic devices, such as cellular phones, personal digital assistant (PDA), and so on. In the exemplary embodiment, a cellular phone is used as an example to illustrate the present battery cover assembly.

Figure 1:
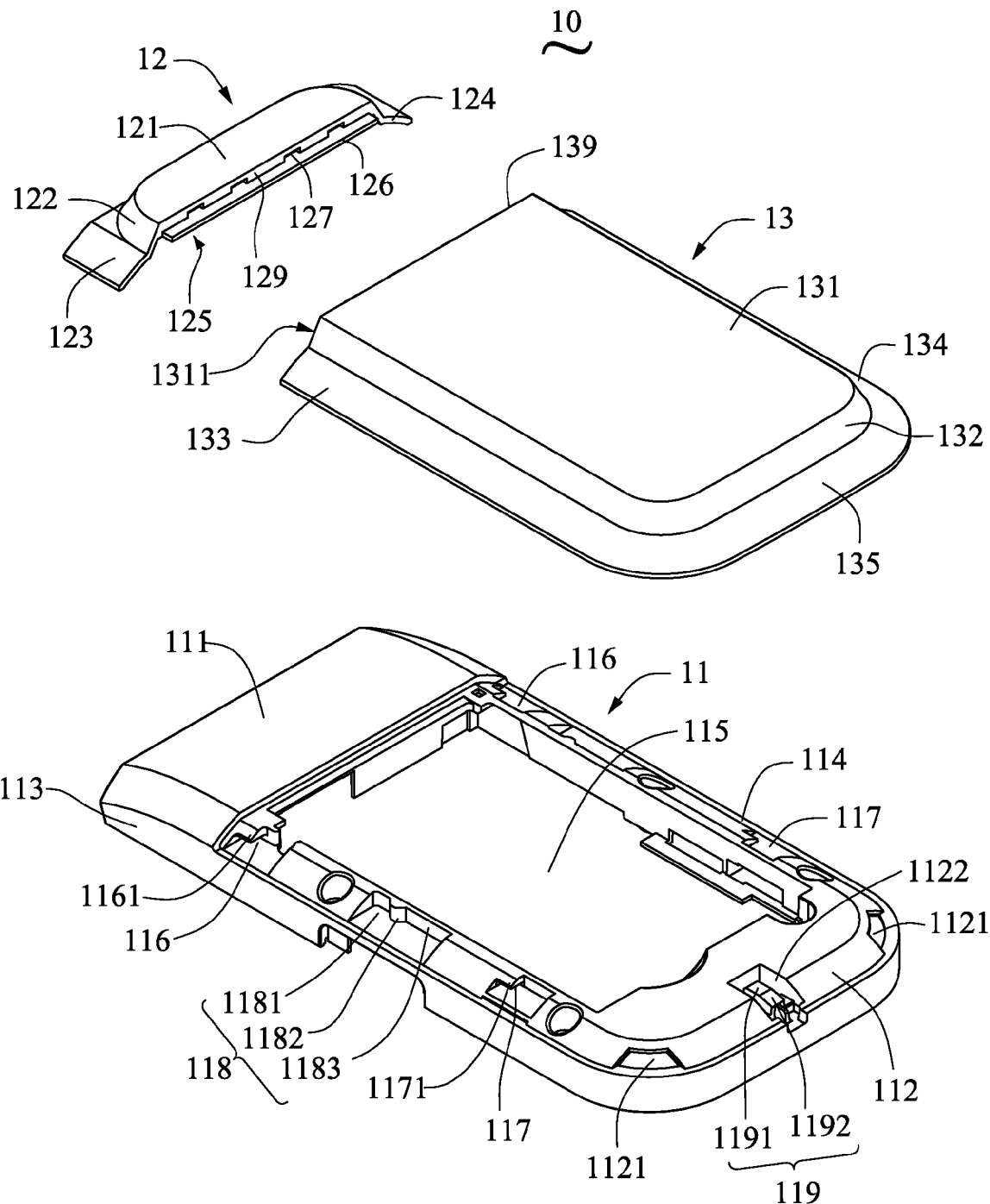
FIG. 1 is an exploded isometric view of the battery cover assembly according to an exemplary embodiment.
Figure 2:
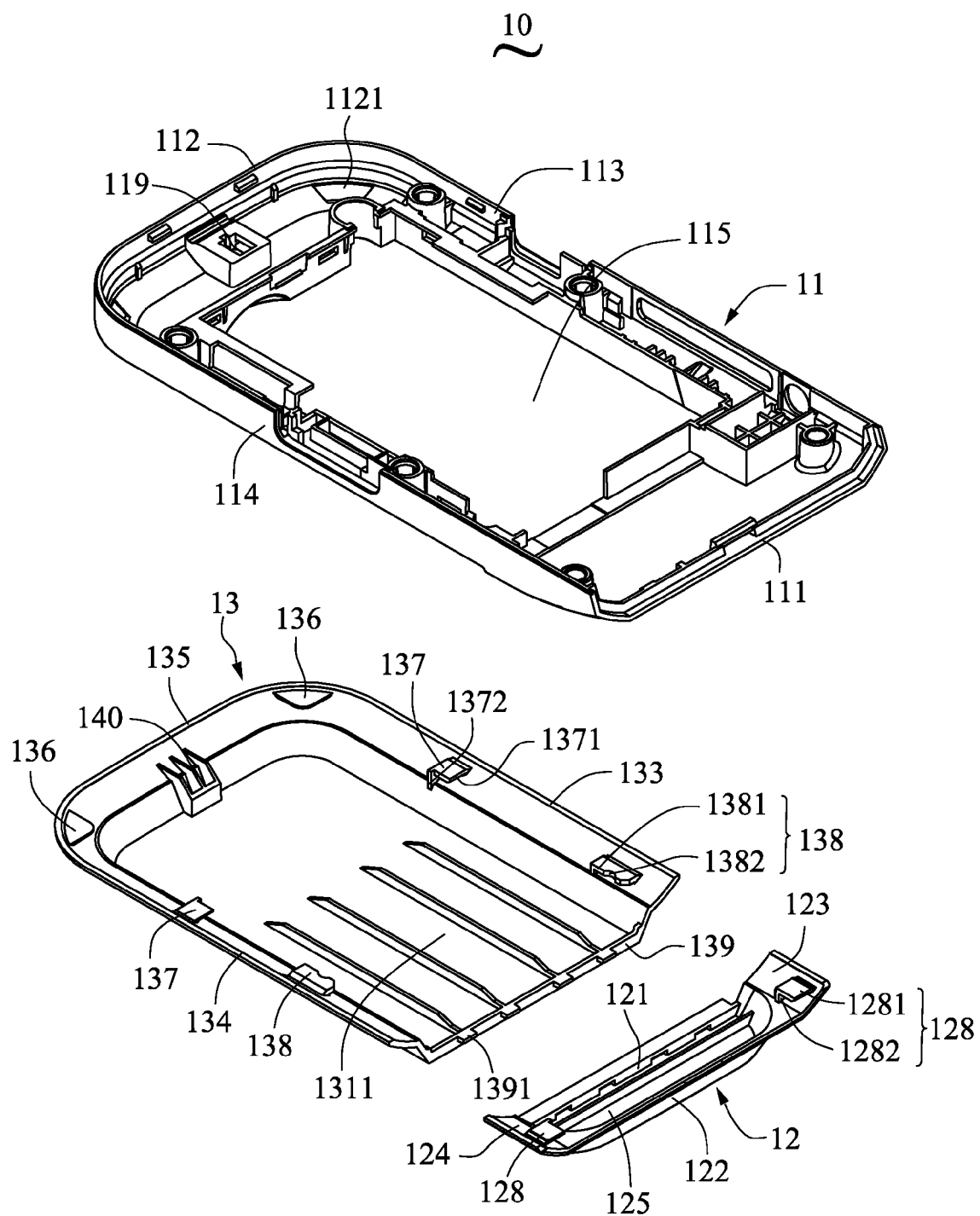
FIG. 2 is similar to FIG. 1, but view from another aspect.

FIGS. 1 and 2 show the battery cover assembly 10 including a body 11, a first cover 12 and a second cover 13. The battery cover assembly 10 is configured for receiving a substantially rectangular battery. The body 11 includes a top wall 111, a bottom wall 112 opposite to the top wall 111 and two opposite sidewalls 113, 114. The top wall 111, bottom wall 112 and the sidewalls 113, 114 define a rectangular battery receptacle 115.

Referring to FIG. 1, a first pair of resisting portions 1161 and a second pair of resisting portions 1171 protrude from the sidewalls 113, 114, respectively, to form a first pair of latching slots 116 and a second pair of latching slots 117, respectively. The first pair of latching slots 116 is close in height to the top wall 111. The second pair of latching slots 117 is close in height to the bottom wall 112. A pair of clasping portions 118 is arranged on the sidewalls 113, 114 between the first pair of latching slots 116 and the second pair of latching slots 117, respectively. Each clasping portions 118 includes a sliding recess 1181 and a block 1182 arranged on a wall of the sliding recess 1181. An adjacent wall 1183 is defined between the sliding recess 1181 and the battery receptacle 115, and the block 1182 protrudes from the adjacent wall 1183.

The bottom wall 112 has two substantially triangular-shaped clasping holes 1121 defined at two opposite ends thereof, and a recessed portion 1122 defined in the middle. An elastic latching member 119, including an abutting portion 1191 and a guiding portion 1192 connected to the abutting portion 1191, protrude from the recessed portion 1122, and is substantially rectangular. The abutting portion 1191 is integrally formed with the body 11. Therefore, the elastic latching member 119 not only can be pushed downward around the abutting portion 1191 but may also return to original position due to the elasticity.

The first cover 12 includes a top wall 121, a connecting wall 122 extending from edges of the top wall 121, and two side walls 123, 124. The first cover 12 is removably mounted to the body 11. The top wall 121 is substantially semi-oval-shaped. The top wall 121 further includes a first engaging surface 129 that is opposite to the connecting wall 122. The side walls 123, 124 incliningly extend from the two sides of the connecting wall 122, respectively, and are configured to engage with the sidewalls 113, 114 of the body 11, respectively. The top wall 121 and the connecting wall 122 cooperatively define a first chamber 125. A substantially rectangular positioning plate 126 protrudes into the first chamber 125 and is adjacent to the first engaging surface 129. A plurality of positioning holes 127 are defined on the first engaging surface 129.

The second cover 13 includes a top wall 131, a connecting wall 132 extending from two lateral sides and one end portion of the top wall 131, two side walls 133, 134, and an end wall 135. The second cover 13 is removably mounted to the body 11. The top wall 131 of the second cover 13 further includes a second engaging surface 139 that is opposite to the end wall 135. The side walls 133, 134 incliningly extend from the two sides of the connecting wall 132 respectively, and the end wall 135 connects the side walls 133, 134. The side walls 133, 134 and the end wall 135 of the second cover 13 engage with the sidewalls 113, 114 and the bottom wall 112 of the body 11, respectively. The top wall 131 and the connecting wall 132 define a second chamber 1311.

Referring to FIG. 2, the body 11, the first cover 12, and the second cover 13 shown in FIG. 1 are flipped so that internal sides of the body 11, the first cover 12 and the second cover 13 are shown. The internal side of the first cover 12 corresponds to the first chamber 125, and the internal side of the second cover 13 corresponds to the second chamber 1311.

Regarding the first cover 12, two substantially L-shaped aligning tabs 128 protrude from the internal side of the sidewalls 123, 124 in accordance with the first pair of latching slots 116. The aligning tabs 128 include portions 1281 and abutting portions 1282 which are vertical to the portions 1281. The portions 1281 are configured to be inserted in the first pair of latching slots 116 and abut against the first pair of resisting portions 1161, respectively.

Regarding the second cover 13, an abutting block 140 for abutting against the elastic latching member 119 of the body 11 protrudes from the central portion of the internal side of the end wall 135. Two clasping blocks 136, which are configured to be inserted in the clasping holes 1121 of the body 11, protrude from two lateral sides of the internal side of the end wall 135. Two substantially L-shaped aligning tabs 137 protrude from the internal side of the sidewalls 123, 124 in correspondence with the second pair of latching slots 117. The aligning tabs 137 include an insert portion 1371 and an abutting portion 1372 disposed vertically to the insert portion 1371. The insert portion 1371 is inserted in the second pair of latching slots 117 and to be abutted against the second pair of resisting portions 1171.

Two elastic tabs 138 protrude from the internal side of the side walls 133, 134 in correspondence with the clasping portion 118 of the body 11. An insert slot 1382 is defined in each of latch planes 1381 of the elastic tabs 138 so each of the block 1182 of the clasping portion 118 of the body 11 can be inserted therein. A plurality of clasping blocks 1391 corresponding to the positioning holes 127 of the first cover 12 protrude from the second engaging surface 139 to receive the clasping blocks 1391 in the positioning holes 127 of the first cover 12.

Figure 3:
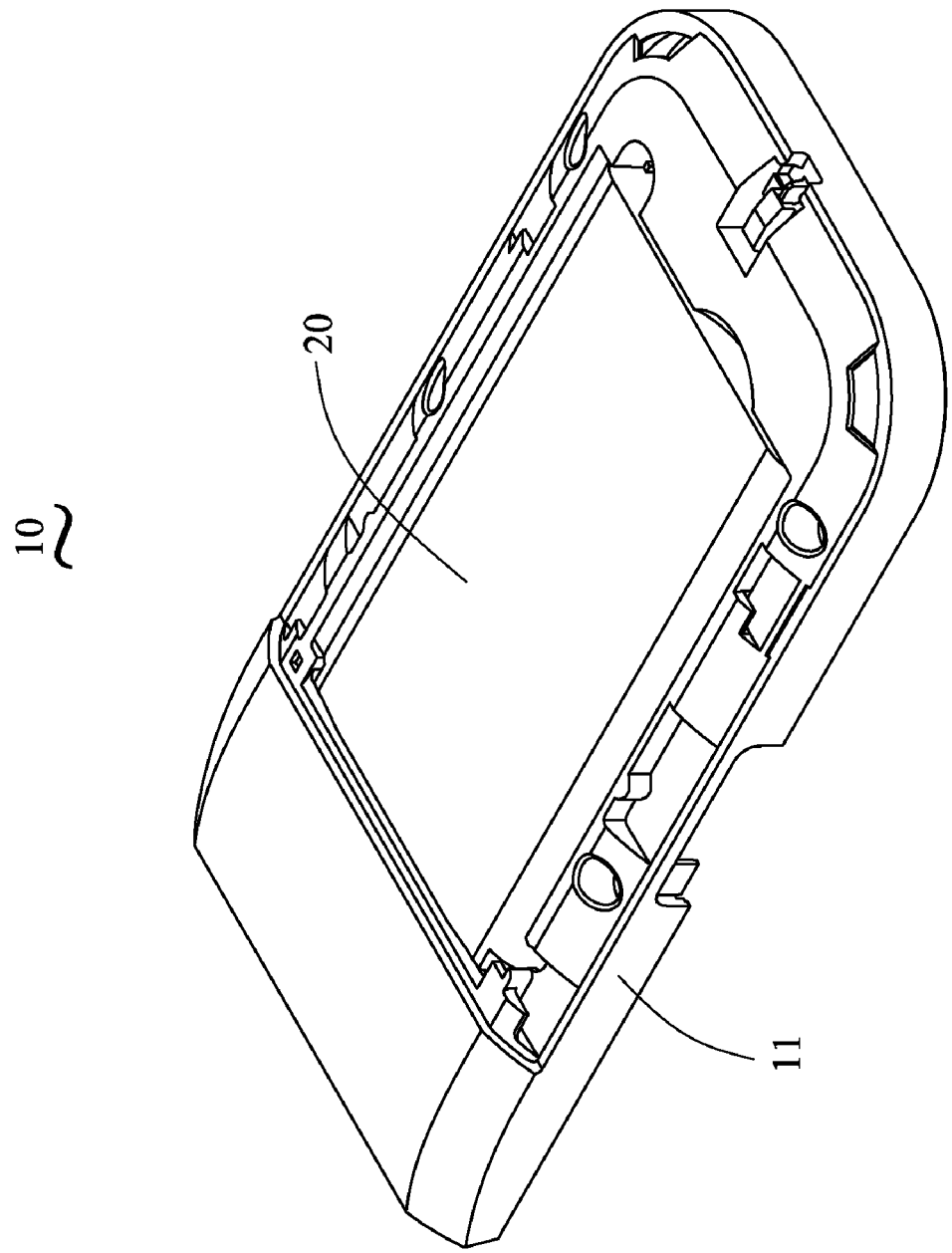
FIG. 3 is a partially isometric view of the battery cover assembly of FIG. 1 with a battery received therein.

FIG. 3 shows a battery 20 received in the battery receptacle 115 of the body 11. The battery 20 is substantially rectangular and is a high capacity battery with a large volume. Accordingly, a portion of the battery 20 protrudes from the battery receptacle 115 while the battery 20 is received therein. The assembly process of the battery cover assembly 10 will be described in detail in the following paragraphs. Referring to FIG. 2, the aligning tabs 128 of the first cover 12 are inserted in the first pair of latching slots 116 of the body 11. In this way, the insert portions 1281 abut against the first pair of resisting portions 1161, and the positioning plate 126 of the first cover 12 abuts against top surface of the battery 20.

Figure 4:
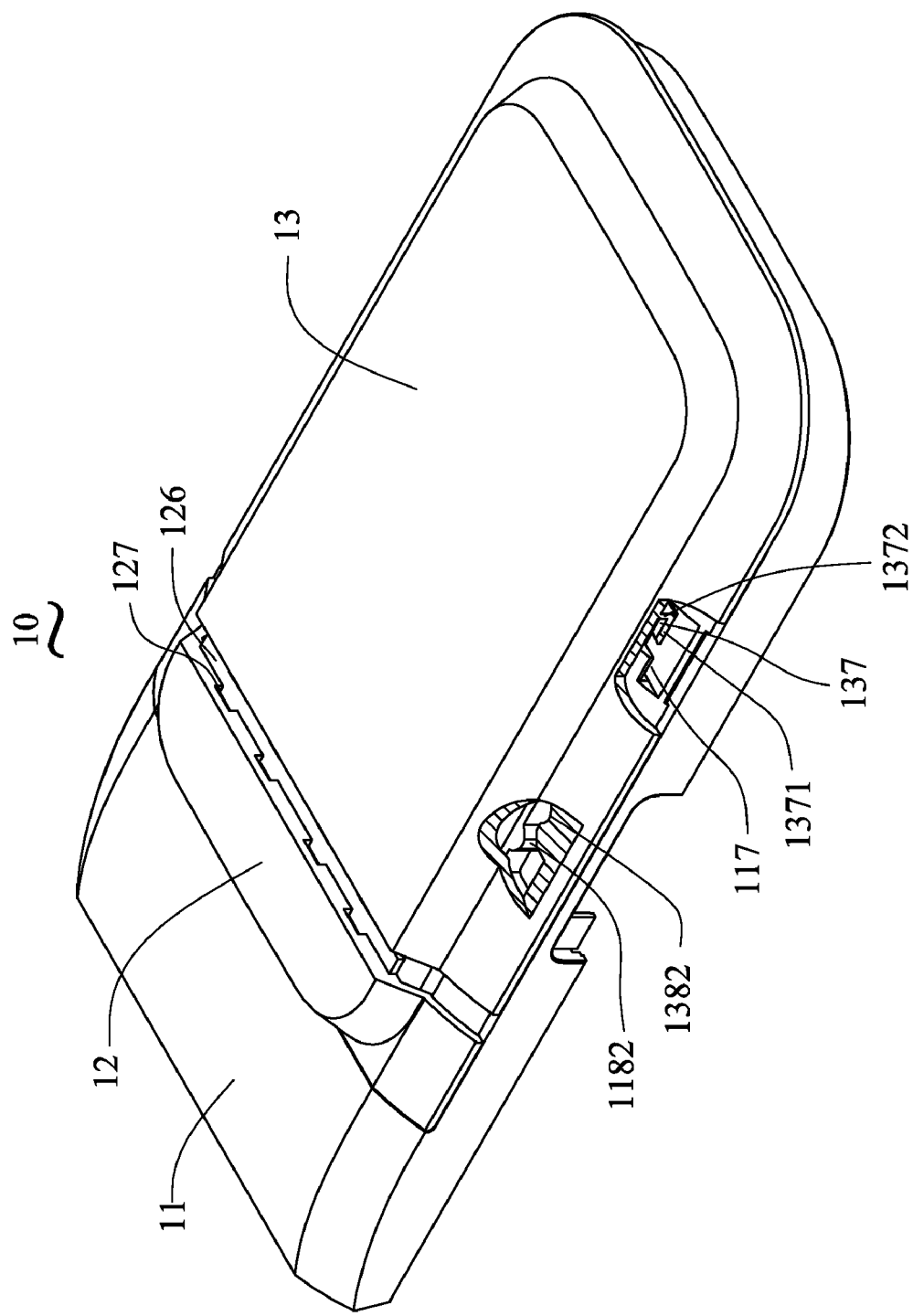
FIG. 4 is an isometric, partially cut-away view showing the battery cover assembly of FIG. 3 during assembly.
Figure 5:
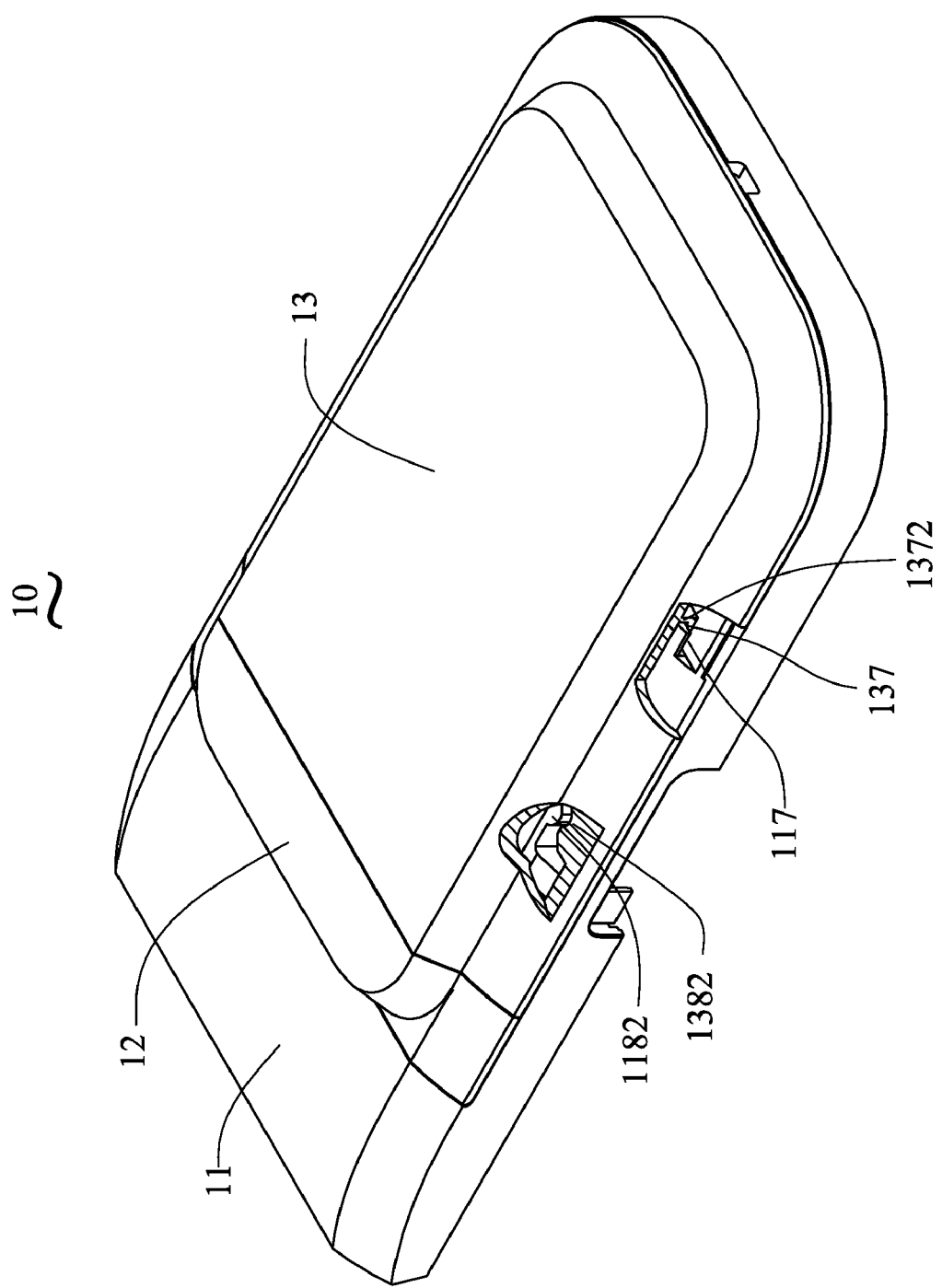
FIG. 5 is an isometric, partially cut-away view showing the assembled battery cover assembly of FIG. 4.

Referring to FIG. 4, the aligning tabs 137 of the second cover 13 are inserted in the second pair of latching slots 117, and the block 1182 of the clasping portion 118 of the body 11 are inserted in the insert slots 1382 of the elastic tabs 138 of the second cover 13. The abutting block 140 of the second cover 13 is pushed along the guiding portion 1192 until the aligning tabs 137 abut against the second pair of resisting portions 1171 of the body 11. At this time, the block 1182 are clasped and received in the insert slots 1382 of the elastic tabs 138. In addition, the abutting block 140 is pushed to press the elastic latching member 119 and then slide into the recess portion 1122 of the body 11. The clasping blocks 1391 of the second cover 13 are inserted in the positioning holes 127 of the first cover 12 so as to accomplish the assembly of the battery cover assembly 10. Referring to FIG. 5, the first cover 12, the second cover 13 and the body 11 are assembled together so as to receive the battery 20.

In another exemplary embodiment, the connecting wall 122 of the first cover 12 may be omitted by extending edges of the top wall 121 of the first cover 12 to form the side walls 123, 124 and an end wall (not shown). The connecting wall 132 of the second cover 13 may also be omitted by extending the edges of the top wall 131 of the second cover 13 so as to form the side walls 133, 134 and the end wall 135.

In another exemplary embodiment, the clasping blocks 1391 may protrude from the first engaging surface 129, and the positioning holes 127 may be defined on the second engaging surface 139.

In another exemplary embodiment, the second cover 13 and the body 11 may be assembled together merely by one of engagements between the elastic tabs 138 and the clasping portion 118 and between the aligning tabs 137 and the second pair of latching slots 117, and by one of the engagements between the abutting block 140 and the elastic latching member 119 and between the clasping blocks 136 and the clasping holes 1121 of the body 11.

The present battery cover assembly 10 is a two-pieces structure including the first cover 12 and the second cover 13. The first cover 12 is assembled to the body 11 via the engagement of the aligning tabs 128 and the first pair of latching slots 116. The second cover 13 is assembled to the body 11 via the engagements of the aligning tabs 137 and the second pair of latching slots 117, the aligning tabs 128 and the clasping portion 118, the clasping blocks 136 and the clasping holes 1121, the abutting block 140 and the elastic latching member 119, and the clasping blocks 1391 and the positioning holes 127. In this way, the first cover 12 and the second cover 13 engages with each other so as to completely cover the battery 20.

It is believed that the exemplary embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A battery cover assembly, comprising:
   a body including a battery receptacle;
   a first cover and a second cover, both of the first cover and the second cover comprising two sidewalls removably mounted to the body and a top wall connected to the pair of sidewalls, the top walls of the first cover and the second cover protruding out from the body while the first cover and the second cover assembled to the body, both of the first cover and the second cover configured to be removably mounted to the body, and the first cover and the second cover being engageable with each other so as to cover the battery receptacle;
   a clasping portion arranged on one of the sidewalls of the body, the clasping portion comprising a sliding recess and a block arranged on a wall of the sliding recess; and
   two elastic tabs protruding from an internal side of the sidewalls of the second cover and correspond with the clasping portion of the body, and each of the elastic tabs defining an insert slot so that each of the block of the clasping portion of the body can be inserted in the insert slots of the elastic tabs of the second cover.

2. The battery cover assembly as claimed in claim 1, wherein the top wall of the first cover includes a first engaging surface, and the top wall of the second cover includes a second engaging surface, the first engaging surface and the second engaging surface are configured to attach to each other.

3. The battery cover assembly as claimed in claim 2, wherein the first engaging surface has a plurality of aligning holes defined thereon, and the second engaging surface has a plurality of clasping blocks corresponding to the aligning holes arranged thereon so that the clasping blocks are inserted in the aligning holes.

4. The battery cover assembly as claimed in claim 2, wherein the first engaging surface has a plurality of clasping blocks arranged thereon, and the second engaging surface has a plurality of aligning holes corresponding to the clasping blocks defined thereon so that the clasping blocks are inserted in the aligning holes.

5. The battery cover assembly as claimed in claim 2, wherein an elastic latching member is arranged on a bottom wall of the body, an abutting block protrudes from an internal side of the end wall of the second cover to correspond with the elastic latching member of the body to elastically abut the elastic latching member.

6. The battery cover assembly as claimed in claim 1, wherein the sidewalls and the top wall of the first cover is connected by a connecting wall and the sidewalls and the top wall of the second cover is connected by a connecting wall to form a first chamber and a second chamber, the second chamber for covering portion of the battery that expose beyond the battery receptacle while the battery is received therein.

7. The battery cover assembly as claimed in claim 1, wherein two aligning tab protrude from the sidewalls of the first cover, a first pair of latching slots is defined on the sidewalls of the body to correspond with the aligning tabs so the aligning tabs may be inserted in the first pair of latching slot.

8. The battery cover assembly as claimed in claim 1, wherein two aligning tabs protrude from the sidewalls of the second cover, a second pair of latching slots is defined on the sidewalls of the body to correspond with the aligning tabs so the aligning tabs may be inserted in the second latching slot.

* * * * *